Jan. 20, 1953 R. H. ANDERSON 2,626,027
SHAFT COUPLING MECHANISM
Filed May 2, 1949 3 Sheets-Sheet 1

Inventor
Roy H. Anderson
By Reynolds & Beach
Attorneys

Jan. 20, 1953 — R. H. ANDERSON — 2,626,027
SHAFT COUPLING MECHANISM
Filed May 2, 1949 — 3 Sheets-Sheet 3
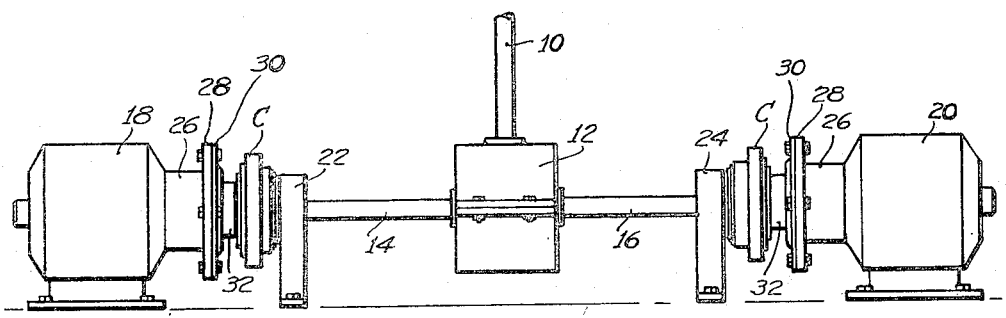
Fig. 3.
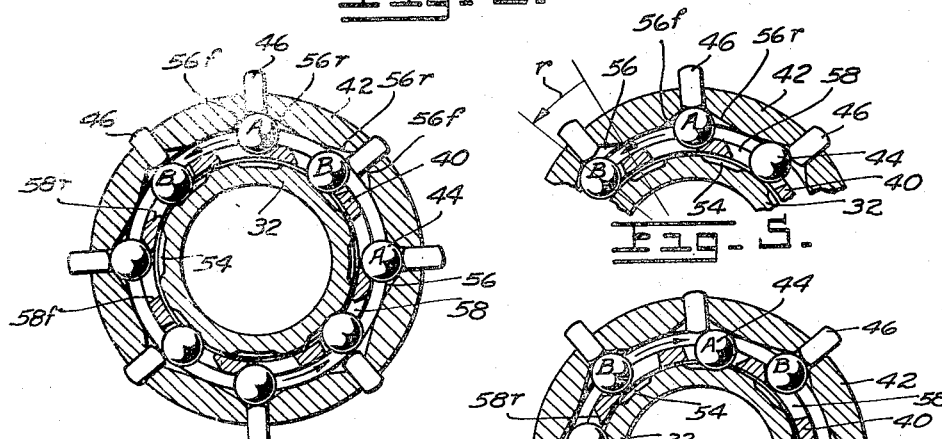
Fig. 4.
Fig. 5.
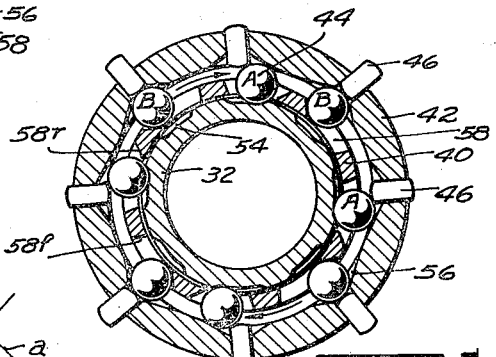
Fig. 6.
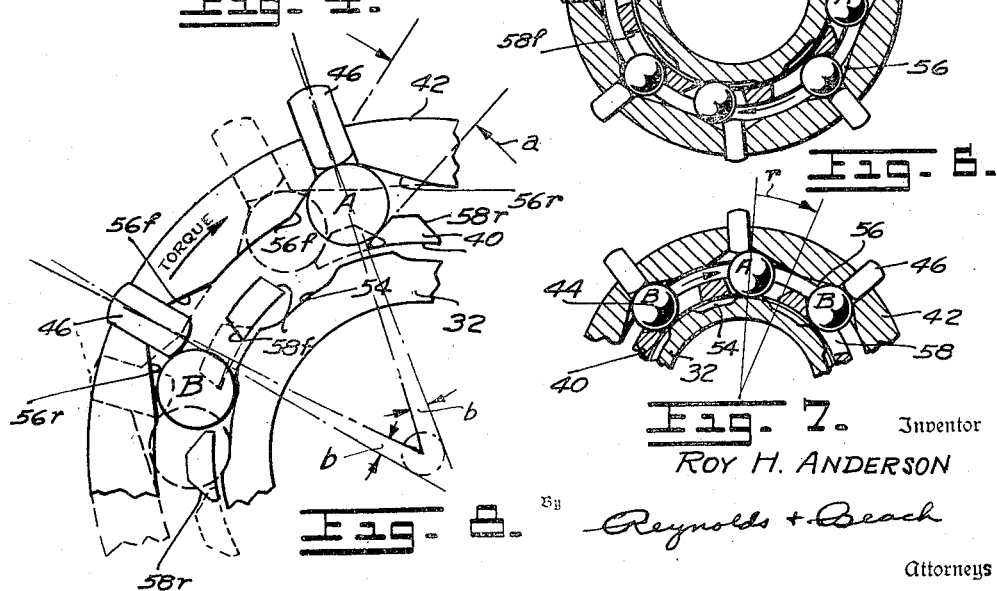
Fig. 8.
Fig. 7.
Inventor
Roy H. Anderson
By Reynolds + Beach
Attorneys Patented Jan. 20, 1953

2,626,027

UNITED STATES PATENT OFFICE 2,626,027

SHAFT COUPLING MECHANISM

Roy H. Anderson, Bellevue, Wash., assignor to Boeing Airplane Company, Seattle, Wash., a corporation of Delaware Application May 2, 1949, Serial No. 90,962

15 Claims. (Cl. 192—8)

This invention relates to selective power transfer mechanism, and more particularly to a selective shaft coupling device operable, in its herein illustrated setting, to transmit both clockwise and counterclockwise rotational torque positively from a first shaft to a second, but operable to lock the second shaft automatically against attempted transmission of torque reversely, from the second shaft to the first shaft. The invention is herein illustratively described as applied to power transfer mechanism for operating the wing flaps of an airplane, although it should be understood that the invention has a wide variety of applications in other fields as well.

An important object of the invention is to provide an automatically operating one-way type coupling device affording positive coupling for the transfer of torque from a drive shaft to a load shaft, and a positive locking action against torque transfer in the reverse direction, irrespective of the sense (viz. clockwise or counterclockwise) of the applied torque in either instance.

Another object of the invention is to devise selective coupling mechanism operable in the foregoing described manner, which is compact, can be conveniently manufactured in any desired size and to withstand comparatively heavy loads. A further important object is to achieve a dependable device of this type which will be extremely durable, the working parts thereof being subjected to no heavy wear regardless of the load transmitted.

The invention includes, in combination, first and second rotative members between and connected respectively to an output or load shaft and an input or drive shaft, a nonrotative third member cooperable with such first and second rotative members, and a plurality of balls retained mutually by said three members and selectively engageable therebetween to effect appropriate interlocking of certain ones thereof automatically with application of driving torque to one or another of such rotative members. In the preferred embodiment of the invention, as herein illustrated, the three members are arranged in interfitting coaxial relationship, the second within the first and the third within the second, forming a compact self-contained unit.

In accordance with a more specific object of the invention the three mentioned coaxial members, two rotative and the third nonrotative, are complementally recessed internally to receive the locking balls, which are distributed therein uniformly about the axis of the coupling unit, so that the device as a whole will be completely symmetrical and balanced for rotation.

In the operation of the unit, when driving torque is applied externally to the first rotative member by the output shaft, irrespective of the direction in which it is applied, one or more of the balls are wedged between cooperating shoulders of such member and the nonrotative third member, respectively thereby locking the former against any rotation, and thus preventing it from transmitting torque to the second member. However, when the second member is turned by power rotation of the input shaft, irrespective of the direction in which it is rotated, one or more of the balls are wedged automatically between other shoulders formed in the first member and cooperating shoulders in the second member to interlock these two members for conjoint rotation, the balls in such instance being diverted from wedging engagement with the nonrotative third member.

In the latter condition of operation the coupling mechanism transmits driving torque, whether clockwise or counterclockwise, from the second member to the first member, both of which are rotative and consequently turn in unison; whereas in the former condition two results obtain: the second member is isolated from the torque externally applied to the first member and the first member is automatically locked to the nonrotative member, and thus is itself held against rotation, in whichever direction such torque acts. A different group of balls, preferably alternate balls in each instance, respectively, effect interlocking of the first and third members for the opposite directions of external torque application to the first member. Likewise a different group of alternate balls effects interlocking of the second member to the first member for the opposite directions of rotation of the second member, respectively, driven by the input shaft. Thus the same balls are wedged against the first member when torque is applied to it in a given direction whether by the second member through such balls or directly by torque exerted on the first member by the output shaft. The wedging will be different, however, in the former instance effected by the second member, and in the latter instance exerted by the first member and reacting on the third member.

The invention further embraces a novel power transfer system comprising a pair of such selective shaft coupling devices, each operatively interposed between a separate drive motor and its output shaft, such output shafts constituting the two branch shafts of a differential gear unit, the common or third shaft of which unit may be connected to a load. In such a system either or both motors may drive through the differential unit at any time, whereas, because of the irreversible character of the selective coupling devices, neither the common shaft nor either of the branch shafts of the differential gearing unit can become drivers to convert torque exerted thereby on the other branch shaft into rotation of the motor coupled to such other shaft by a coupling device such as described. Thus the torque of one motor cannot be transmitted through the two branch shafts, their couplings and the differential gearing to effect rotation of the other motor. Likewise the common or load shaft cannot drive either motor.

In the illustrative case of raising and lowering the wing flaps of an airplane these motors will both normally operate together at a given speed. However, should one motor for any reason fail to operate, because of the isolation effect against reverse drive between the motors, afforded by the coupling unit of the inoperative motor, this will not interrupt the continued operation of the other motor. Instead the common shaft of the differential gearing unit will continue to be turned by the rotation of the single branch shaft, which is still motor driven, but at one-half the speed at which it would be turned if both branch shafts were being driven at equal speeds. In all cases after the wing flaps are adjusted to the desired position and the drive motors deenergized, no locking of the shafts or wing flaps other than the inherent locking action of the selective coupling units themselves is necessary to hold the flaps in their adjusted positions against air loads.

It will therefore be evident that the flaps can be driven in either direction by either or both motors, that failure of either motor will not prevent operation of the flaps by the other motor, although at a slower speed, and that the position of the flaps cannot change in either direction in any stage of adjustment except as effected positively by operation of one or both motors. Full and safe control over positioning of the wing flaps is thereby assured.

These and further features, objects and advantages of the invention will become evident from the following description based upon the accompanying drawings.

Figure 3 is a side elevation view of a power transfer system of the dual motor type embodying the invention.

Figure 1:
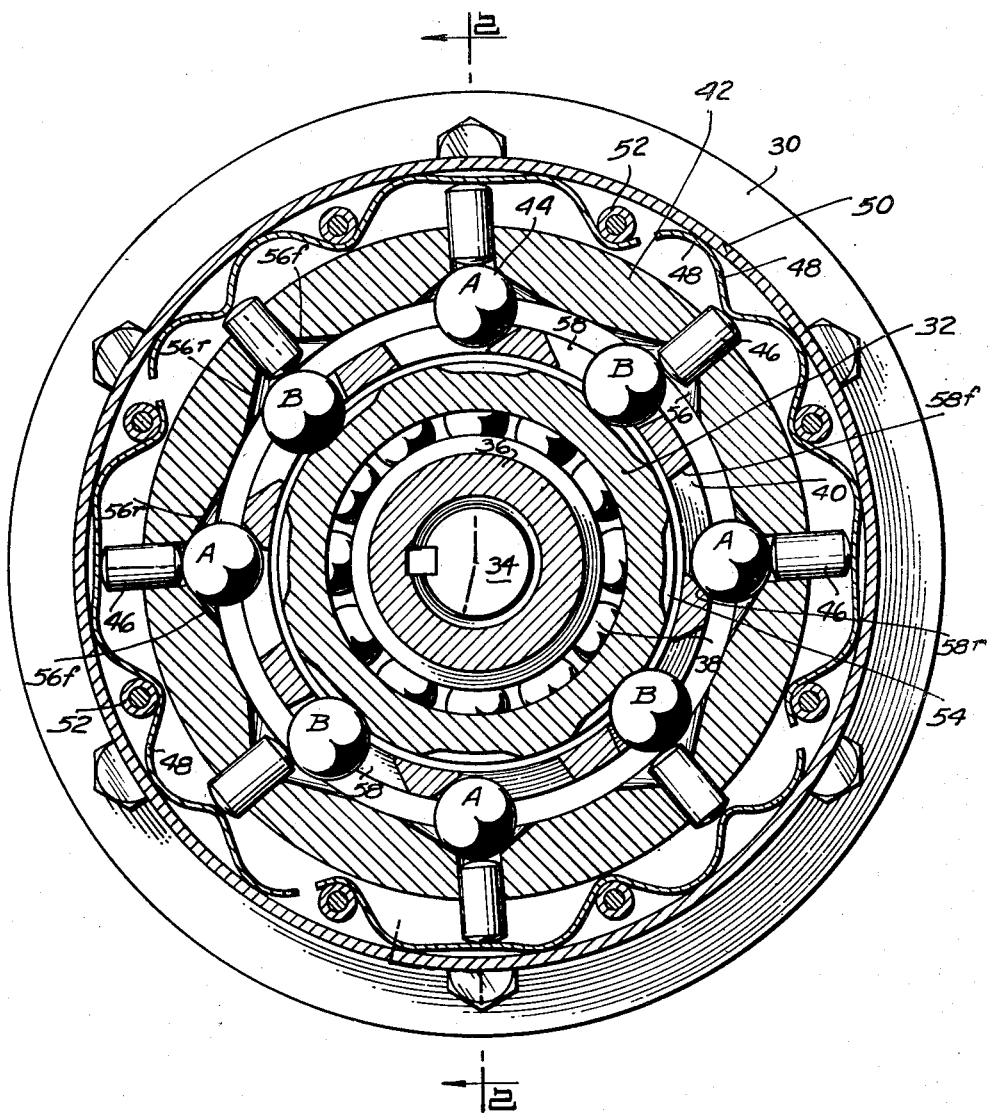
Figure 1 is a transverse sectional view of the preferred form of my selective shaft coupling unit, taken on section line 1—1 of Figure 2.

Figure 4 is a simplified transverse sectional view of the selective coupling unit, showing the two rotative members thereof interlocked, and rotating in one direction around the centrally located nonrotative third member by torque applied to the intermediately located rotative member; and Figure 5 is a fragmentary view correspondingly taken, showing the unit at a slightly later point in the cycle of rotation thereof in order to illustrate the positional shift of the idling balls alternately positioned among other balls then interlocking the rotating members.

Figures 6 and 7 are operating views corresponding respectively, to Figures 4 and 5, but showing the outer and intermediate members of the coupling unit rotating in the reverse direction under application of torque to the same rotative member as before, but in the opposite sense.

Figure 8 is a fragmentary outline view of the coupling unit, showing by dotted lines the relationship of the parts for normal driving rotation, as in Figure 4, for instance, and showing in solid lines the interlocking action of the balls as between the outer rotative member, connected to an output shaft, and the centrally located, nonrotative third member, to prevent the outer member from driving the intermediate member.

In the selective power transfer system shown in Figure 3, the load shaft 10 is connectible, for example, to the wing flap operating mechanism (not shown) of an airplane. This shaft is connected to the common output element of a conventional differential gear unit 12. Branch shafts 14 and 16 are connected, respectively, to the side elements of the differential gearing of unit 12, and for present purposes, as viewed in the figure, may be assumed to be driven in opposite senses, in each instance looking along the shaft toward the differential, by their respective drive motors 18 and 20, to rotate shaft 10 at a speed twice that which one of the shafts 14 and 16 alone would accomplish.

Since the flaps must be both raised and lowered, the motors 18 and 20 selected are of the reversible type and may be electrically connected in the same energizing control circuits (not shown) to stop, start and reverse them simultaneously. Journals 22 and 24 support shafts 14 and 16, respectively.

A selective shaft coupling device C of the type already generally referred to is operatively interposed in the branch of the system between motor 18 and shaft 14, and an identical coupling device is similarly located between motor 20 and shaft 16. Because of the symmetrical construction of my coupling device as will subsequently appear, the two connected to motor 18 and to motor 20 may be identical.

Figure 2:
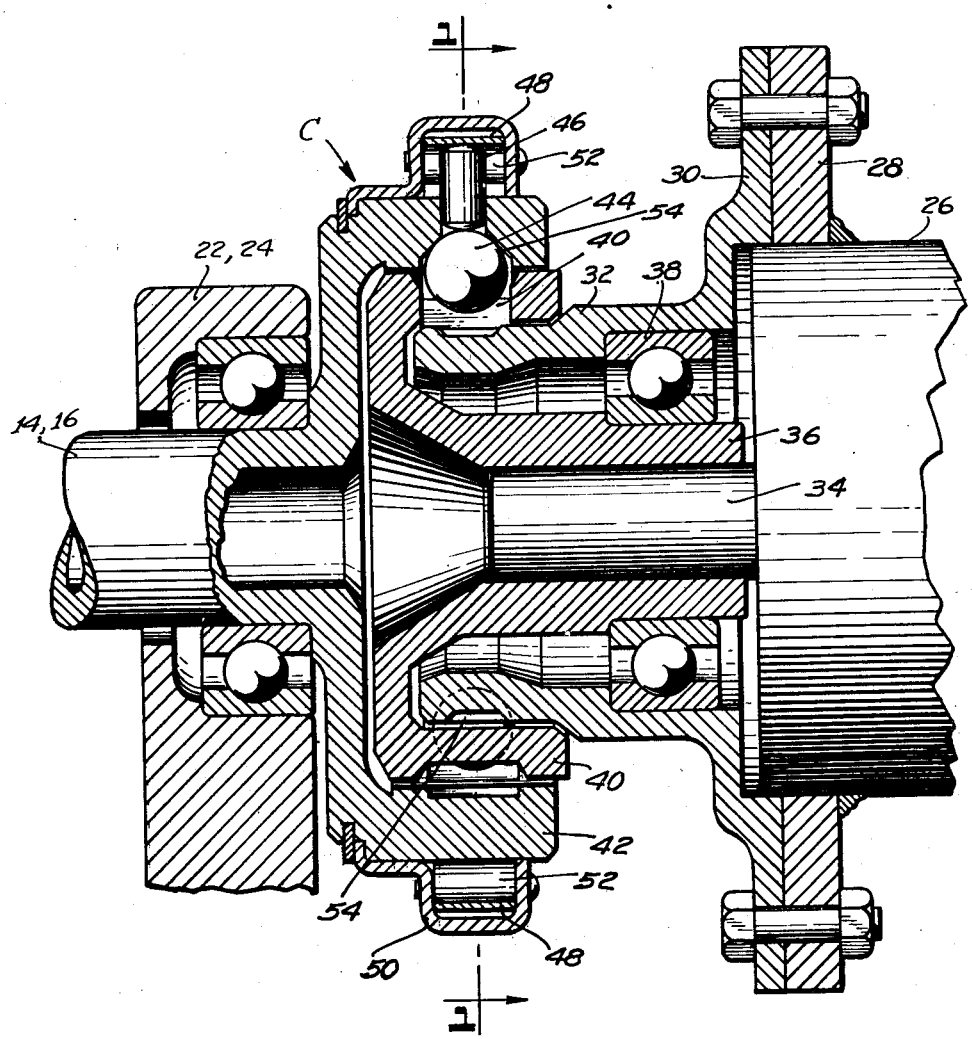
Figure 2 is a longitudinal sectional view along the axis of the unit, taken on section line 2—2 of Figure 1.

The detailed construction of the coupling device C is clearly illustrated in Figures 1 and 2, wherein the broken-off shaft part 14, 16 represents either of the branch shafts 14 and 16 connectible to the differential unit 12 in Figure 3. Such broken-off shaft 14, 16 is supported by its corresponding journal support 22, 24.

A fixed part of the motor housing, or a fixed element suitably mounted stationarily relative thereto, is designated 26. This element, preferably in the form of a cylindrical flange projecting axially from the motor housing, has an outwardly-turned flange 28 apertured at circumferential intervals for bolting to it a corresponding flange 30 formed on the end of a tubular element 32. The latter element constitutes the previously-mentioned nonrotative third member of the coupling unit.

The motor shaft 34 projects axially into and is keyed to a tubular sleeve 36 journaled by a radial ball bearing unit 38 within the tubular nonrotative element 32, for effecting driving rotation of such sleeve by the motor shaft. The end of sleeve 36 remote from the motor housing has a radially outwardly extending plate element carrying an annular skirt or tubular flange 40 projecting axially over and encircling the free end of the nonrotative tubular element 32. This tubular flange 40 constitutes the inner one of the rotative members of the coupling unit, as previously mentioned. This member can be rotated in either direction selected by shaft 34 of reversible motor 18 or 20 to which it is keyed.

The second and outer rotative member of the selective coupling unit is formed by the sleeve or tubular flange 42 encircling the inner rotative member 40, which in turn encircles the stationary member 32. This member 42 is conveniently illustrated as being formed as an integral part of the hollow shaft 14, 16 journaled within the support 22, 24, but it will be readily evident that the rotative member 42 may be fabricated separately and secured to the shaft.

The remaining separate elements of the selective coupling unit include a plurality of balls 44 retained, in a manner later described, in the annular space between the outer rotative member 42 and the stationary member 32, occupied also by the inner rotative member 40 having cavities therein receiving the several balls. A plurality of spring-urged, inward-acting detents or holders 46 are reciprocably received in generally radial bores through the outer rotative flange member 42 and cooperate respectively with the individual balls 44, tending to urge such balls normally inward through radial openings in the inner rotative member, against the periphery of the nonrotative member 32.

The detent pins 46 are acted on by circumferentially spaced convolutions of a segmented sinuous spring band 48 encircling the outer rotative member 42 by which it is carried, and enclosed by a suitable casing 50 encircling such band, as shown in Figure 1. Extending between opposite side walls of the casing 50 and located at regular intervals around its circumference are pin-supported spring-retaining rollers 52 engaged in alternate convolutions of the segments of spring band 48, to restrict radial expansion of the spring band segments and thus prevent them shifting circumferentially to move their inwardly projecting bends out of proper registry with the corresponding detent pins acted upon by them.

As shown most clearly in Figure 1 the retained balls 44, received in the apertures 58 of the inner rotative member 40, may project into complemental recesses 54 formed in the outer surface of the stationary member 32, and 56 formed in the inner surface of the outer rotative member 42. Each recess 56 in the outer member is of generally conical shape, through the apex of which projects a detent pin 46. The recesses 54 in the stationary member 32 are somewhat elongated circumferentially of it. Eight balls in all are shown in the illustrated construction, and these are alternately labeled with the letters "A" and "B," around the circumference of the unit.

Because of certain differences in the formation of the alternate recesses 56 in the outer rotative member 42 and alternate openings 58 in the inner rotative member 40, those balls in the "A" set will produce the interlocking effect for conjoint rotation of both of members 40 and 42 in one direction and for locking the outer rotative member when torque is applied to it in the opposite direction by its shaft, whereas those in the "B" set will come into similar action for the opposite sense of conjoint rotation of members 40 and 42 and for locking the outer rotative member when torque is applied to it in the opposite direction by its shaft. This effect is obtained by the circumferentially opposite sides of each such recess 56 and opening 58 being inclined oppositely and differently in degree with respect to radial lines of member 42 passing through them, forming shoulders against which the balls may wedge.

Before elaborating further on the form of the apertures and recesses, it should be pointed out that the total number of balls used is not critical and that any plurality of balls will result in an operative selective coupling unit as long as there is at least one combination of outer rotative member recess 56, inner rotative member opening 58, and ball of the "A" type and one of the "B" type. Each such outer member recess is retained generally in registry with a corresponding aperture of the inner rotative member by the ball received in them. Since the torque load is transmitted from one shaft to another through the "A" set of balls for torque of one sense and through the "B" set for torque of the opposite sense, it is obvious that the torque capacity or limit of the coupler will be the same in both senses of torque application, if there are equal numbers of "A" balls and "B" balls, and this capacity will be increased generally with an increase in the total number of balls of each type, provided that the size of balls is the same and the strength of the rotative elements is sufficiently great. Likewise the particular locations of the individual balls and ball recesses circumferentially of the unit is not critical, but since it is preferred that the coupling unit be symmetrical in every respect, balanced physically, and that its load capacity in both senses of torque application be equal, an even number of balls is used, distributed in a uniform pattern about the axis of the unit.

Figure 8 shows best the preferred construction of the three principal concentric annular members 42, 40 and 32, only one "A" ball and one "B" ball being illustrated in conjunction with cooperating fragmentary adjacent portions of such principal members, it being understood that these balls and cooperating member portions are representative of the remaining balls and cooperating portions of the entire unit illustrated in Figure 1, for example. The particular recess 56 of the outer rotative member 42 in which the "A" ball is in part retained has one comparatively steeply sloped side 56f, such as on the circumferentially counterclockwise side of the recess, while the circumferentially clockwise side 56r of such recess is less steeply sloped, such sides being oppositely sloped to converge outwardly toward the apex of the recess through which the spring-actuated detent pin 46 enters. The degrees of inclination of the walls of the corresponding recess 56 in which the "B" ball is lodged are similar to those of walls of the recess for ball "A" but interchanged in position, the circumferentially clockwise wall in this instance being steeper and the circumferentially counterclockwise wall being less steep.

The term recess "sides" as herein used to designate the walls 56f and 56r of the recesses 56 spaced circumferentially of the annular member 42 does not postulate a flat-sided or rectangular cross-section recess, and preferably the recesses are conical. The angle between the circumferential walls of all of the recesses 56 is the same and is preferably somewhat in excess of a right-angle, but for adjacent recesses the bisectors of such angles, corresponding to the axis of such recesses, are inclined equally and oppositely relative to the respective radii of member 42 which pass through the corresponding cone apices. The inclination of each such bisector or recess axis relative to the corresponding radius line of member 42 is usually less than 10 degrees. Likewise I prefer that each detent pin 46 projecting inwardly into a recess 56 be cocked slightly, its axis being inclined inwardly toward the less steeply sloped side 56r of such recess, by a small angle b of a few degrees. The length of the less steeply sloped recess sides 56r exceeds that of the more steeply sloped sides 56f. The circumferential width of the recesses at their widest point may approximate two ball diameters, as shown.

The openings 58 in the intermediate, or inner rotative, member 40 each have circumferentially opposite sides inclined to different degrees relative to radial lines through their respective centers, and diverging outwardly. The sides of openings 58 which retain the "A" balls are similarly inclined to those which retain the "B" balls but are interchanged in position. The circumferentially counterclockwise side 58f of each "A" ball aperture is comparatively steep, and in this case is directed almost radially of member 42 since it functions merely as a retainer wall, whereas the circumferentially clockwise side 58r has a different function and is inclined appreciably relative to the radius line of member 42 passing through the center of such aperture, the inclination being such as to dispose such side substantially parallel to the steeper side 56f of the adjoining recess 56 in member 42 when the ball A is interengaged therebetween. Actually I prefer, for a reason which will appear, that a small angle a, not exceeding a few degrees, be formed between these respective sides 56f and 58r when positioned with a ball wedged between them, as shown in Figure 8. The sides of each aperture 58 receiving a ball "B" are inclined oppositely in relation to the "A" ball aperture sides so that the side 58r of the "B" ball aperture will be opposite side 56f of the cooperating recess 56 in member 42.

The recesses 54 in the nonrotative inner member 32 are shallower than the recesses 56 in member 42, and are somewhat less in circumferential extent. Recesses 54 also have sloping circumferentially spaced sides, which diverge outwardly, but such sides are short and the slope of each is not particularly critical. All of these recesses are identical and the inclination of their opposite sides is preferably alike in each such recess 54. The reason for such conformation is that, while members 40 and 42 do not rotate relatively, but always conjointly, they both rotate relative to member 32, so that sometimes an "A" ball and sometimes a "B" ball rests in any given recess 54. The bottoms of such recesses may have a considerable circumferential extent.

The reasons for the details of the construction and shapes of the parts described and their various relationships can be appreciated best from a description of the operation of the selective coupling device. It will be assumed first that the intermediate, or inner rotative, member 40 is being driven counterclockwise, as viewed in Figure 4, in the direction of the arrows, by its motor shaft 34. Immediately thereupon an initial slight lost motion occurs between the input member 40 and the output member 42, in which alternate balls making up one set, such as the set of "A" balls, are caught up by the sides 58r of apertures 58 in member 40, and wedged between them and the correspondingly sloped slides 56f of the recesses in the member 42, creating a positive, direct coupling between these members 40 and 42 and causing them to rotate conjointly thereafter. Now should the member 40 be rotated oppositely by rotation of its shaft 34 in the reverse direction, the alternate "B" set of balls will be similarly caught up by the sides 58r of their set of apertures 58 in member 40 and wedged between such sides and the coacting, oppositely located surfaces 56f of the "B" ball sockets in member 42 (see Figure 6) to interconnect effectively the members 40 and 42, as before, but for conjoint rotation in the opposite direction.

In either case, for one direction of drive of member 40, the output member 42 is positively coupled thereto through the balls 44 of one or the other set, "A" or "B." Balls of the set not so acting at any time are simply retained loosely in their apertures 58 in the inner rotative member 40 and ride idly over the low ridges and drop into the successive shallow recesses in the then ineffective nonrotative inner member 32 as they are swept around the periphery of such member by conjoint rotation of the members 40 and 42.

While some rattling or vibration is created as the balls of the idling set thus ride over the ridges of the member 32 (as shown in Figures 5 and 7) and intermittently drop back into recesses 54 (as shown in Figures 4 and 6), such vibration is largely suppressed or held to a minimum by action of the spring-urged detents 46 already described. The detents yield to a ball thrust outwardly in passing over a ridge on member 32, to give it clearance, but they likewise force the ball back into the succeeding recess 54 coming beneath it. This action tends to prevent conditions of mechanical resonance which might otherwise develop in the device at different rotative speeds as a result of oscillation of the balls.

During driving by member 40 the angle a (Figure 8) between cooperating surfaces 58r of the inner rotative member 40 and 56f of the outer rotative member 42 tends to forcibly slide or wedge the ball engaged therebetween outwardly, more firmly into the apex of the adjoining recess 56 against the slight resistance of the spring-urged detent 46 projecting into such recess. Because such detent pin is cocked at the angle b relative to a radius of member 42 in a direction toward the ball, which is not wedged into the socket 56 exactly axially, but rather toward the more steeply inclined side 56f, such detent is not appreciably bound by friction within its guide bore in member 42 to resist the outward force exerted on it by the ball. The amount of the spring force on the detent is not sufficiently great to prevent seating of the ball in the apex of the recess. Accordingly there is full assurance that none of the balls in the active set will be engaged for coupling purposes between members 40 and 42, to the exclusion of other balls in the same set being identically so engaged. The balls of a set therefore actively share the load equally, since each is wedged positively into the same position in its recess 56 where it occupies the same engaging relationship between members 40 and 42 as do the other balls of the same set.

Moreover, such inclination of the detent pin enables it to act more directly on the ball, pressed by its spring, to force the ball out of the apex of the socket when the wedging force on the ball is relieved by stopping the rotation of member 40 or reversing its direction of rotation.

During driving rotation of member 40 to rotate member 42, whether clockwise or counterclockwise, the non-rotative inner member 32 is decoupled from both and offers no appreciable resistance to such rotation, except as there may be a negligible resistance set up from the idling balls being forced against and then riding up on the ridges of its irregular periphery, as the members 40 and 42 move through the angle r from the position of Figure 4 to that of Figure 5, or from the position of Figure 6 to that of Figure 7, depending on the direction of rotation of such members. However, the instant the member 40 ceases to become the driver of member 42, and an attempt is made to reverse their roles by application of torque to member 42 through its shaft 14 or 16, such latter member is immediately locked to the nonrotative member 32 by one or the other set of balls, "A" or "B," depending upon sense of the torque on member 42 applied by its shaft, to prevent such reverse driving action. Hence member 40 can never be driven by member 42 in whichever direction torque is applied to it by its shaft, because the balls in one or the other set, depending upon the attempted direction of rotation of member 42, will become wedged between such member and the nonrotative member 32 to lock the outer member 42 positively against any rotation.

Such positive locking action is effected in the manner illustrated by solid lines in Figure 8, wherein it is assumed that external torque of clockwise sense is applied to the member 42 (see arrow). When this occurs, the balls of one group, such as "B," forced inwardly by the detents 46, become wedged by such applied torque between the lesser sloped sides 56r of the recesses 56 in member 42 and an opposing shoulder or side of a recess 54 on the periphery of the nonrotative member 32. The member 42 can rotate only through the small angle from the dotted line position to the solid line position before such wedging action occurs, and the greater the torque applied the greater will be such wedging action.

Meanwhile the balls of the alternate group, the "A" balls in this instance, are idle, and may, if formerly engaged between members 40 and 42 for driving the latter member in a direction opposite to the presently applied torque, remain in their engaged positions, as shown in Figure 8. However, they then, of course, transmit no torque to the member 40. If the external torque applied to the member 42 reverses, member 42 will turn through a small angle relative to member 40, releasing balls A for inward movement into contact with member 32, so that the role of the ball sets to interlock members 42 and 32 becomes similarly reversed and member 42 is again locked against rotation after only such small movement as necessary to clamp the "A" balls has occurred.

Translating these features and operating characteristics of the selective shaft coupling device into terms of operation of the illustrative system shown in Figure 3, it will be evident that the following operation can occur. When both of the reversible motors 18 and 20 operate together in the same direction to drive the respective shafts 14 and 16 through their corresponding couplings, full power is transmitted to rotate load shaft 10 at full speed in one direction or the other. Should one motor fail, the other will continue to turn shaft 10, although at half speed and power, but nevertheless will not be also rendered ineffective by virtue of the dropping out of the other motor. The independence of the motors in this respect is maintained by the selective coupler C of the failing motor automatically locking its branch shaft against rotation. Not only is the effectiveness of the drive arrangement for rotation in either direction thus preserved, but possible damage to the inoperative motor is avoided by preventing its rotation.

When the load is appropriately positioned by shaft 10 and both motors are deenergized, both branch shafts 14 and 16 are locked by the selective couplings to prevent any involuntary appreciable rotational shifts of the load shaft 10 caused by air forces on the airplane flaps or on other mechanism which such shaft is arranged to operate. Thus the latter's position depends in all cases entirely upon its being positively driven by either or both motors. The same action occurs when the torque is applied clockwise or counterclockwise to any of the shafts in the system beyond the couplings.

It should be borne in mind that the invention is not limited to the preferred form illustrated and described, or to the typical setting or system shown, but has utility for various applications utilizing the same principles.

I claim as my invention:

1. Coupling mechanism comprising an outer annular rotative member, a plurality of balls received therein, an inner annular rotative member apertured to receive said balls and disposed coaxially within said outer rotative member, and a nonrotative member received coaxially within said inner rotative member, said outer rotative member and said nonrotative member having ball-receiving recesses therein, arranged cooperatively with the ball-receiving apertures of said inner rotative member, for engagement of said balls both in the recesses of said outer rotative member and the apertures of said inner rotative member while dislodged from the recesses of said nonrotative member to effect rotation of said outer rotative member by rotation of said inner rotative member, and for engagement of said balls in the recesses of the outer rotative member, in the apertures of said inner rotative member, and in the recesses of said nonrotative member to restrain rotation of said inner rotative member by the application of torque to said outer rotative member.

2. Coupling mechanism comprising a first rotative member, a stationary member spaced therefrom, a second rotative member interposed between said first rotative member and said stationary member and in coaxial relation to said first rotative member, and a plurality of roller elements retained by said second rotative member and interlockingly engageable between said first and second rotative members while dislodged from said stationary member to effect rotation of said first rotative member by rotation of said second rotative member, and interlockingly engageable between said first rotative member and said stationary member to restrain rotation of said second rotative member by said first rotative member, by locking said first rotative member to said stationary member upon application of torque thereto independently of said second rotative member.

3. Coupling mechanism comprising a first rotative tubular member, a second rotative tubular member disposed coaxially within said first member, a stationary, generally cylindrical third member disposed coaxially within said second rotative member, said second rotative member having openings therein communicating between opposing generally cylindrical surfaces of said first rotative member and said stationary member, and said cylindrical surfaces having corresponding complemental ball-receiving recesses therein, and a plurality of balls received one in each of said second rotative member openings and corresponding first rotative member recesses, the sides of these recesses and openings being formed such that when said second rotative member is rotated a ball is engaged between a side of an opening in said second rotative member and a side of a recess in said first rotative member to interlock said first and second rotative members together for conjoint rotation relative to said stationary member, and the sides of the first rotative member recesses and of the stationary member recesses being formed such that when torque is applied to said first rotative member independently of said second rotative member a ball is engaged between a side of a recess in said first rotative member and an opposite side of a recess in said stationary member to interlock said first rotative member and said stationary member to prevent rotation of said first and second rotative members relative to said stationary member.

4. A shaft coupling device comprising an annular outer member, an output shaft connected thereto, a tubular inner member disposed coaxially within said outer member and spaced radially inwardly therefrom, a plurality of balls received in the space between said inner and outer members, an annular intermediate member disposed coaxially of and interposed between said outer and inner members, and apertured to receive said balls, and an input shaft extending through said tubular inner member and carrying said intermediate member, said balls being engageable selectively between said intermediate member and said outer member to interlock them by rotation of said intermediate member, and between said outer member and said inner member to interlock them by torque applied to said outer member by said output shaft.

5. Power transfer mechanism comprising power means including a drive shaft and a fixed member, a stationary sleeve encircling said drive shaft, extending coaxially therewith and carried in cantilever fashion by said fixed member of said power means, an inner rotative sleeve encircling said stationary sleeve, connected to said drive shaft at a point beyond the free end of said stationary sleeve, and having circumferentially spaced apertures therein, an outer rotative sleeve encircling said inner rotative sleeve, a power output member connected to said outer rotative sleeve, and a plurality of balls received in the apertures of said inner rotative sleeve and between said stationary sleeve and said outer rotative sleeve, engageable selectively with said outer rotative sleeve and said stationary sleeve to lock the former to the latter against attempted rotation of said outer rotative sleeve by said power output member, and with said inner and outer rotative sleeves while disengaged from said stationary sleeve to lock said inner and outer rotative sleeves together for conjoint rotation thereof by rotation of said drive shaft.

6. Coupling mechanism comprising three annular members arranged in coaxially nested relationship, the inner and outer of said members having irregular annular surfaces respectively adjacent the inner and outer surfaces of the intermediate one of said members, and the intermediate member having therein a plurality of apertures communicating between said irregular surfaces, and a plurality of balls received each in a separate one of such apertures in said intermediate member, at least one of said balls being engageable with said irregular surfaces of both said inner and outer members to lock said three members together positively against relative rotion in either direction, each aperture in said intermediate member being so shaped as to dislodge its ball from engagement with one of said irregular surfaces by rotation of said intermediate member.

7. The coupling mechanism defined in claim 6, and a power input shaft operatively connected to the intermediate one of the members, a power output shaft operatively connected to the outer one of the members, and anchor means holding the inner one of the members stationary.

8. Coupling mechanism comprising a movable first member, a second member, said first and second members having opposing surface portions spaced apart and generally parallel, a movable third member interposed between said first and second members and spaced from said opposing surface portions thereof, and having an opening therein communicating between said opposing surface portions of the first and second members, and a roller element received freely in said third member opening in the space between said opposing surface portions of said first and second members and such surface portions having complementally disposed roller-element-receiving recesses therein, the recesses in said first and second members being shaped such that slight movement of said first member relative to said second member produces positive interlock of said first member to said second member by engagement of a roller element in corresponding recesses in said first and second members, and the third member opening having a side engageable by said roller element and effective to press such element against the opposite side of said first member recess and away from said second member recess upon initiation of movement of said third member in one direction, whereby similar movement is imparted through such first member through said roller element.

9. Coupling mechanism comprising a movable first member, a second member, said first and second members having opposing surface portions spaced apart and generally parallel, a movable third member interposed between said first and second members and spaced from said opposing surface portions thereof, and having at least two openings therein communicating between said opposing surface portions of the first and second members, and a roller element received freely in each of said third member openings in the space between said opposing surface portions of said first and second members and such surface portions having complementally disposed roller-element-receiving recesses therein, the two sides of each first member recess spaced in the direction of movement thereof being inclined different degrees, the adjacent sides of adjacent recesses being inclined substantially equally but in opposite directions, and one side of each opening in the third member being inclined approximately parallel to the opposite side of the corresponding recess in said first member, so that driving force of said third member in either direction of movement produces positive interlock of said first member to said third member by engagement of a different roller element for each such direction of movement with alternately opposed sides of the corresponding first member recess and third member opening receiving such roller element, whereby force effecting such movement of said third member can be transmitted positively from said third member to said first member in either direction, and the sides of said second member recesses being formed such that when driving force is applied to said first member in either direction independently of said third member a roller element is engaged between a side of a recess in said first member and an opposite side of a recess in said second member to lock said first member to said second member and prevent transmission of such latter force to said third member.

10. The coupling mechanism defined in claim 9, and additionally including a spring-urged element projecting into each roller-element-receiving recess in the first member and into contact with the roller element therein, tending to urge such roller element out of such recess and against the second member.

11. The coupling mechanism defined in claim 9, and additionally including a spring-urged detent pin projecting into each roller-element-receiving recess in the first member and into contact with the roller element therein, tending to urge such roller element out of such recess, said pin being slightly cocked to direct its force application at a small angle from the normal to the line of movement of said first member, and inclined inward relative to such normal toward the less steeply sloped side of such recess.

12. The coupling mechanism defined in claim 9, wherein the steeper side of each first member recess is substantially parallel to the opposite side of its corresponding third member opening, and their inclination is such that the roller element received in such corresponding first member recess and third member opening will be wedgingly urged up into the first member recess by movement of the third member and there held by the third member to maintain positive driving engagement of such roller member with the first member.

13. The coupling mechanism defined in claim 9, means supporting the first and third members for conjoint rotation about a common axis, and means operable to restrain rotation of the second member in either direction.

14. Coupling mechanism comprising a first rotative member having a plurality of apertures therethrough, a plurality of balls of a diameter greater than the thickness of said rotative member, and received respectively in the apertures of said first rotative member, a second rotative member adjacent to one side of said first rotative member, disposed coaxially thereof, rotative about a common axis therewith, and having therein ball-receiving recesses corresponding to the apertures of said first rotative member, and a third member adjacent to the other side of said first rotative member, and having a shoulder thereon, a side of each aperture in said first rotative member being formed to project its ball into the corresponding socket of the second rotative member by rotation of said first rotative member, thereby to interconnect said first and second rotative members for conjoint rotation, and a recess of the second rotative member being formed to move its ball outwardly of such recess and to press it against the shoulder of said third member, to effect interlocking of said second rotative member and said third member by torque applied to said second rotative member independently of said first rotative member.

15. Coupling mechanism comprising a first rotative member having a plurality of apertures therethrough, a plurality of balls of a diameter greater than the thickness of said rotative member, and received respectively in the apertures of said first rotative member, a second rotative member adjacent to one side of said first rotative member disposed coaxially thereof, rotative about a common axis therewith, and having therein ball-receiving recesses corresponding to the apertures of said first rotative member, and a third member adjacent to the other side of said first rotative member, and having a shoulder thereon, a side of each aperture in said first rotative member being formed to project its ball into the corresponding socket of the second rotative member by rotation of said first rotative member, thereby to interconnect said first and second rotative members for conjoint rotation, and a spring-urged detent element carried by said second rotative member, and projecting into a recess thereof, to move its ball outwardly of such recess, and to press it against the shoulder of said third member, to effect interlocking of said second rotative member and said third member by torque applied to said second rotative member independently of said first rotative member.

ROY H. ANDERSON.

REFERENCES CITED

The following references are of record in the file of this patent:

UNITED STATES PATENTS

| Number | Name | Date |
|---|---|---|
| 1,076,416 | Gammeter | Oct. 21, 1913 |
| 1,076,632 | Gammeter | Oct. 21, 1913 |
| 1,385,785 | Hofer et al. | July 26, 1921 |
| 1,519,309 | Hummel | Dec. 16, 1924 |
| 1,689,751 | Rengler | Oct. 30, 1928 |
| 2,300,022 | Swartz | Oct. 27, 1942 |
| 2,339,232 | Moroney | Jan. 11, 1944 |
| 2,371,442 | Hammond | Mar. 13, 1945 |
| 2,509,541 | Suska | May 30, 1950 |